United States Patent
Estrada (10) Patent No.: US 10,329,792 B2
(45) Date of Patent: Jun. 25, 2019

(54) WATER GAP MANAGED BREAKAWAY SYSTEM

(71) Applicant: Water Gap Saver, LLC, Santa Margarita, CA (US)

(72) Inventor: Michael Estrada, Santa Margarita, CA (US)

(73) Assignee: Water Gap Saver, LLC, Santa Margarita, CA (US)

( * ) Notice: Subject to any disclaimer, the term of this patent is extended or adjusted under 35 U.S.C. 154(b) by 302 days.

(21) Appl. No.: 15/408,661

(22) Filed: Jan. 18, 2017

(65) Prior Publication Data

US 2017/0218656 A1    Aug. 3, 2017

Related U.S. Application Data

(60) Provisional application No. 62/288,996, filed on Jan. 29, 2016.

(51) Int. Cl.
*E04H 17/06* (2006.01)
*A01G 13/00* (2006.01)

(52) U.S. Cl.
CPC ............. *E04H 17/06* (2013.01); *A01G 13/00* (2013.01)

(58) Field of Classification Search
CPC .......... E04H 17/10; E04H 17/12; A01K 3/002
USPC ..................................... 256/13, 54
See application file for complete search history.

(56) References Cited

U.S. PATENT DOCUMENTS

| 276,679 | A | 5/1883 | Gier |
| 486,463 | A | 11/1892 | Green |
| 934,999 | A | 9/1909 | Cummings |
| 1,045,447 | A | 11/1912 | Sheppard |
| 1,710,982 | A | 4/1929 | Holstein |
| 2,895,716 | A * | 7/1959 | Veltri ...................... E04H 17/10 256/23 |
| 4,480,403 | A * | 11/1984 | Williams ............... A01G 17/14 47/42 |
| 5,301,925 | A | 4/1994 | Carlson |
| 6,612,550 | B2 * | 9/2003 | Foot ........................ E04H 17/20 256/1 |
| 6,960,728 | B1 * | 11/2005 | Halderman .......... H01B 17/145 174/158 F |
| 8,480,061 | B2 * | 7/2013 | Graves .................... E04H 17/20 248/220.21 |

(Continued)

OTHER PUBLICATIONS

American Fence and Supply Co., "How to Install High Tensile Barbed Wire and Field Fence," https://web.archive.org/web/20000302080359/http://www.afence.com/BekaertBrochure.html, Jan. 24, 2016, 13 pages, Texas.

(Continued)

*Primary Examiner* — Joshua T Kennedy (74) *Attorney, Agent, or Firm* — SoCal IP Law Group LLP; Jonathan Pearce (57) ABSTRACT

A water gap managed breakaway device includes a frame including an opening for fixing the frame relative to a fence post within a water gap and including at least one projection substantially perpendicular to a fence passing over the water gap, and a joining member configured to join the at least one projection with the fence by maintaining tension between the fence and the at least one projection, the tension releasable by operation of debris on the joining member while the debris passes through the water gap.

20 Claims, 6 Drawing Sheets

(56) References Cited

U.S. PATENT DOCUMENTS 9,611,670 B1 * 4/2017 Pacheco ................. A01K 3/00

OTHER PUBLICATIONS

DARE Products, Inc., "DARE High Tensile Fence System," pamphlet, 16 pages, Battle Creek, Michigan.
Hearne Steel Company, Inc., "Product Information—T-Post Line Wood Adapter," https://web.archive.org/web/20150517062509/http://www.hearnesteel.com/ProductsCatalog/ProductInformation/ProductID/477, Jan. 24, 2016, 1 page.
Hoover Fence Co., "Hardware Index, Double Wood to Steel Post Adapters," https://web.archive.org/web/20120616024936/http://www.hooverfence.com/woodfence/dwpa.htm, Jan. 24, 2016, 2 pages.
Moechnig, Howard, "Managing Grazing in Stream Corridors," Nov. 2007, 33 pages, Minnesota Department of Agriculture, Minnesota.
Show Me Cables, "Middle Atlantic Triangle Wall Support Bracket, 24"W," http://www.showmecables.com/product/CLB-TSB-W24.aspx, Jan. 24, 2016, 1 page.
Smirkin Goat Farm, "Electric Fencing," https://web.archive.org/web/20150530003741/http://www.smirkingoat.com/and/fence/fencepage.html, Jan. 24, 2016, 11 pages.

* cited by examiner

WATER GAP MANAGED BREAKAWAY SYSTEM

RELATED APPLICATION INFORMATION

This patent claims priority from U.S. provisional patent application No. 62/288,996 entitled "Water Gap Managed Breakaway System" filed Jan. 29, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to agricultural fencing and, more particularly, to a system for managed breakaway of water gap fencing during water level rise.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A water gap managed breakaway system may be used in conjunction with typical fencing techniques used on ranches and farms. As will be discussed more fully below, the water gap managed breakaway system reduces or eliminates much of the time required to clean out or rebuild water gap fencing following rain or water movement.

By way of background, the phrase "water gap" is applied in general parlance to mean fencing that crosses or runs through creeks, washes, ditches, and similar low-lying areas where water has a tendency to move in rainy times or seasonally. The phrase water gap may also be applied to the creek, wash, ditch or the like over which water gap fencing must run. However, as used herein, water gap refers to the fencing itself. Water gaps may be permanent, in situations in which ponds, flowing rivers, or creeks are crossed. Water gaps may also be temporary in cases of ditches and washes such that water only flows periodically or during certain time periods.

Farmers and ranchers use water gaps to cover creeks and washes, which typically means that the fencing must somehow extend lower so as to fill the "gap" created by the water or low-lying area of land. As is also typical, it is preferable that the fencing over the water or low-lying area remain taught. In general, fencing tension helps to discourage livestock and other animals from breaking the fencing, passing through the fencing, or otherwise damaging the fencing or escaping the field in which they have been placed.

As a result, most water gaps employ some form of hanging fencing, fixed, lower fencing, or other device so as to fill the gap. This is fine, so long as the water flow (or lack thereof) remains constant. However, in rainy times, water gaps inevitably fill with water and other debris such as limbs, tumbleweeds, leaves, trash, dirt, and other detritus. Virtually every form of water gap, therefore, interferes with the clear passage of the debris and, often, results in damage to the water gap and, potentially, to the overarching fencing itself when debris flows through the water gap.

If the debris damages the overarching fencing or the water gap fencing, the fence may need to be re-laid or may need to be repaired. To introduce sufficient tension back into the fencing, this process may be laborious. Patching a fence can work for the first several repairs, but eventually it becomes easier and more practical to simply re-lay the fence line. Otherwise, the fence line may be slack and livestock may cause further damage to the fencing or escape.

As used herein, a "dead man" means a submerged or partially submerged ground anchor that is used as an anchor, for example, for fencing. A "dead man" may be, for example, a t-post that has been driven into the ground two or three feet so that only a portion of the t-post appears above the ground, or another fixed contact point, for example a rebar, a wooden fence post, or steel pipe set in concrete or otherwise anchored so that movement of water and debris in the water gap will not alter the dead man's position. The water gap managed breakaway device 100 may slip over, and affix itself to any of these types of dead men.

Figure 1A:
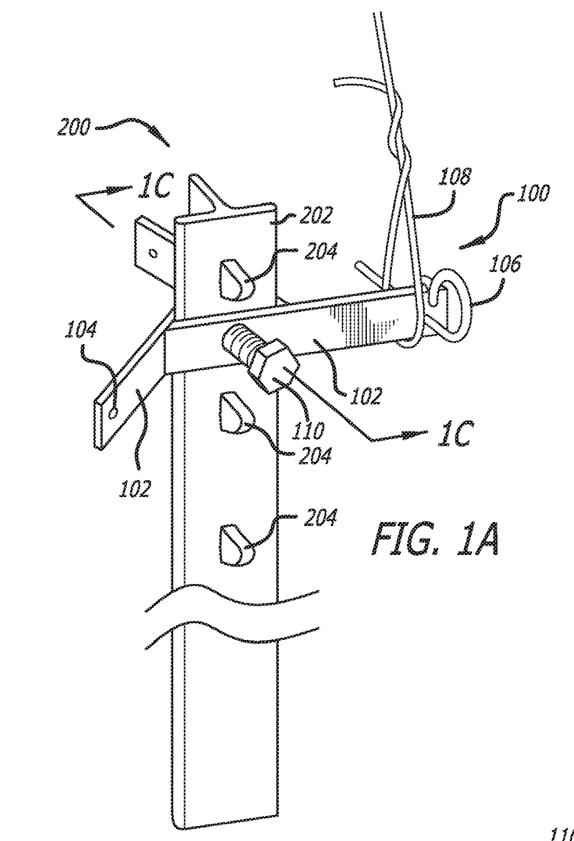
FIG. 1A is a perspective view of a water gap managed breakaway device on a t-post.

FIG. 1A is a perspective view of a water gap managed breakaway device 100 on a t-post 200. The water gap managed breakaway device 100 includes a series of projections 102 around a central frame 103 including an opening 105, each projection 102 including a hole 104 for interaction with a retaining clip 106, and a joining member 108, along with a fixing means 110. The t-post 200, including the post 202 and studs 204, is shown, but other types of posts may be used.

The water gap managed breakaway device 100 may include one or more projections 102. As shown in FIG. 1A, the projections 102 may extend outward from the water gap managed breakaway device 100 as a series of arms and may be a result of the configuration of the frame 103 of the water gap managed breakaway device 100 itself. For example, as seen more clearly in FIG. 1B, the frame 103 of the water gap managed breakaway device 100 may be made up of a series of steel bars welded together or from a hardened, injection-molded plastic formed as a single piece such that a series of projections 102 extend outward from the frame 103 of the water gap managed breakaway device 100.

Though the projections 102 are shown as mere extensions outward, parallel to the frame 103, the projections 102 may be formed in other ways, extending slightly downward so as to better retain the joining member 108 or extending upward but coated with anti-slip material so as to better retain the joining member 108 in place.

The frame 103 is the central area of the water gap managed breakaway device 100 that forms an opening and to which the projections 102 are joined. Though the frame 103 is shown as triangular in form, it may take virtually any shape. A triangular shape may be used because a triangular opening fits snugly over typical t-post and y-post configurations. When the triangular configuration is used, the fixing means 110 may press the frame 103 into the t-post such that the water gap managed breakaway device 100 is held firmly in place between studs (or "nubs") of a t-post or y-post. In cases in which circular piping is used for fencing, other configurations, such as circular configurations, or when square, wooden fence posts are used, square configurations may be used.

Figure 1B:
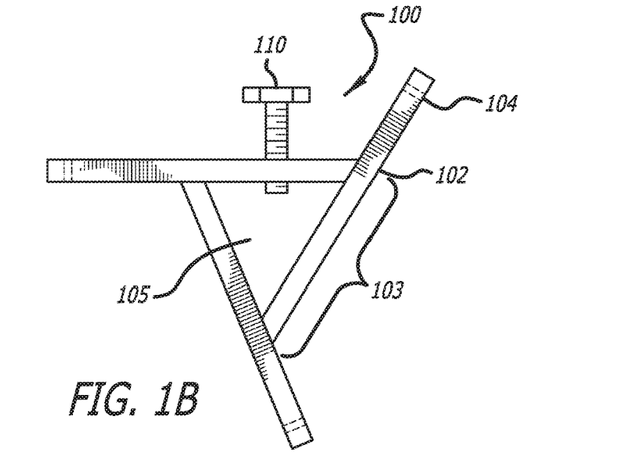
FIG. 1B is a top view of a water gap managed breakaway device.
Figure 1C:
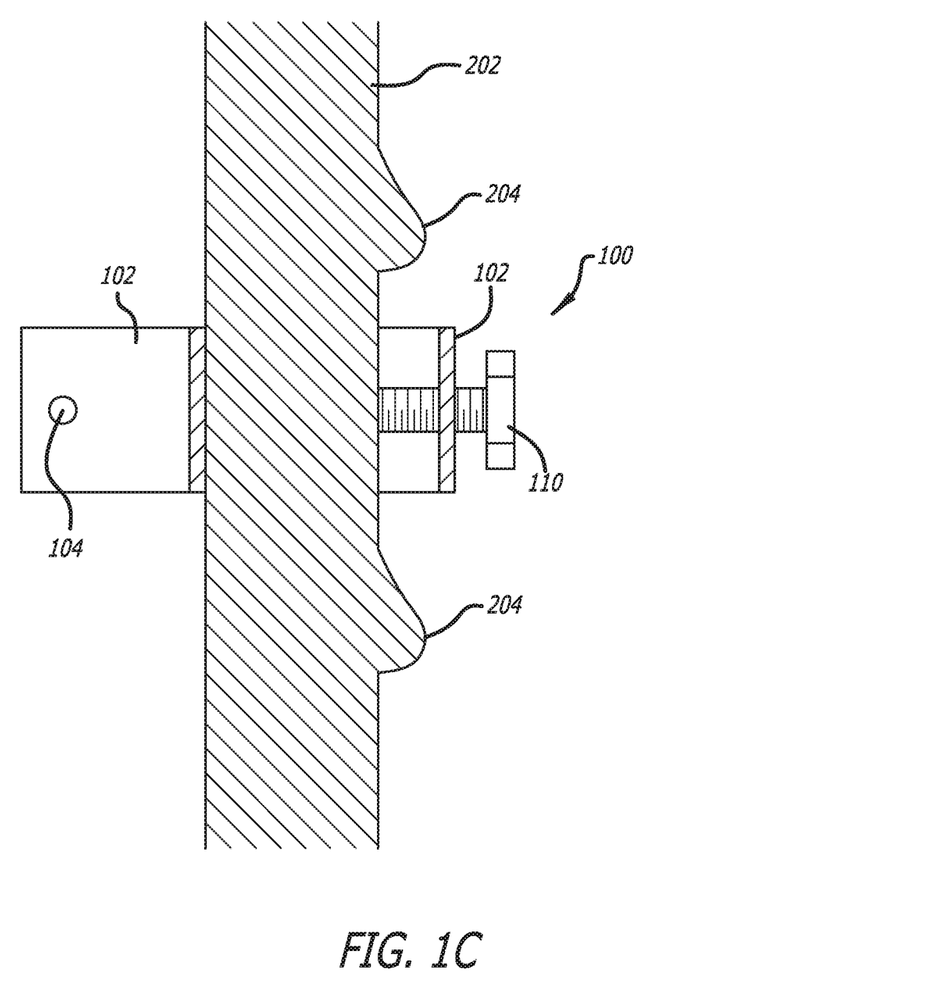
FIG. 1C is a cross-sectional view of a water gap managed breakaway device.

Turning to FIG. 1C, a cross-sectional view of a water gap managed breakaway device 100 is shown. The fixing means 110, may be more clearly seen in FIG. 1C. The fixing means 110 as shown is a bolt which is threaded so as to match a corresponding threaded hole in the frame 102 of the water gap managed breakaway device 100. Alternatively, the hole in the frame 102 may not be threaded, but a corresponding threaded nut may be welded to the back of the hole suitable for engaging the fixing means 110. When the fixing means 110 is engaged with the t-post 202, in addition to the frictional force that maintains the frame 102 in place, the studs 204 will also prevent the water gap managed breakaway device 100 from moving substantially up or down on the t-post 202 unless the fixing means 110 is substantially loosened. When loosened, the fixing means 110 enables the frame 102 to pass over the top of the t-post 202 and over the studs 204.

The fixing means 110 may be a threaded bolt and threaded hole combination, a wing nut, multi-sided bolt systems, clamps, brackets, fasteners, clips, and similar bracing devices. The fixing means 110 may be integral to the frame 103 such that the frame itself may be collapsed on a t-post or other fence material. The fixing means 110 may be or include anti-slip or grip material applied to the interior of the frame 103, within the opening.

The fixing means 110 may be the configuration of the frame 103 itself which may be specifically sized to fit the exterior dimensions of a particular standardized size of fencing. For example, the fixing means 110 may take the form of a buckle formed as a part of the frame 103 itself such that the buckle may be disengaged, the frame 103 may be opened using a hinge, the frame 103 fixed around a fence post, then the buckle re-engaged to thereby fix the water gap managed breakaway device 100 around the fence post. The interior dimensions of the frame 103, then, may be precisely formed such that the water gap managed breakaway device 100 cannot move between multiple studs on a t-post or the interior of the frame may be coated with anti-slip or grip material so that the water gap managed breakaway device may stay in place, once buckled around a fence post, without reliance upon any studs or other retaining aspects of the fence post itself.

Still further alternatively, the fixing means 110 may be a nail, screw, bolt, pin, grip spike, hinge-and-buckle, or similar device that is fixed to the water gap managed breakaway device 100 above and/or below the water gap managed breakaway device 100 once it is placed on a fence post, that, once fitted in place will stop the frame 103 from moving upward or downward on the fence post.

FIG. 1B is a top view of a water gap managed breakaway device 100. The projections 102, frame 103, hole 104 and opening 105 may be seen from the a top view, but have substantially the same functions as described above with reference to FIG. 1A. The opening may be of a size to suitably fit over standard sizes of fencing, including t-posts, wooden or steel fencing. For example, internal dimension of one side of the triangular opening 105 shown in FIG. 1B may be between 1.5 and 2.5 inches along one of the triangular sides so as to fit over standard t-post fencing. A preferable dimension is 2 and ⅛ inches along one of the sides. At this dimension, the water gap managed breakaway device 100 may fit securely over most sizes of standard t-posts and y-posts.

Figure 2:
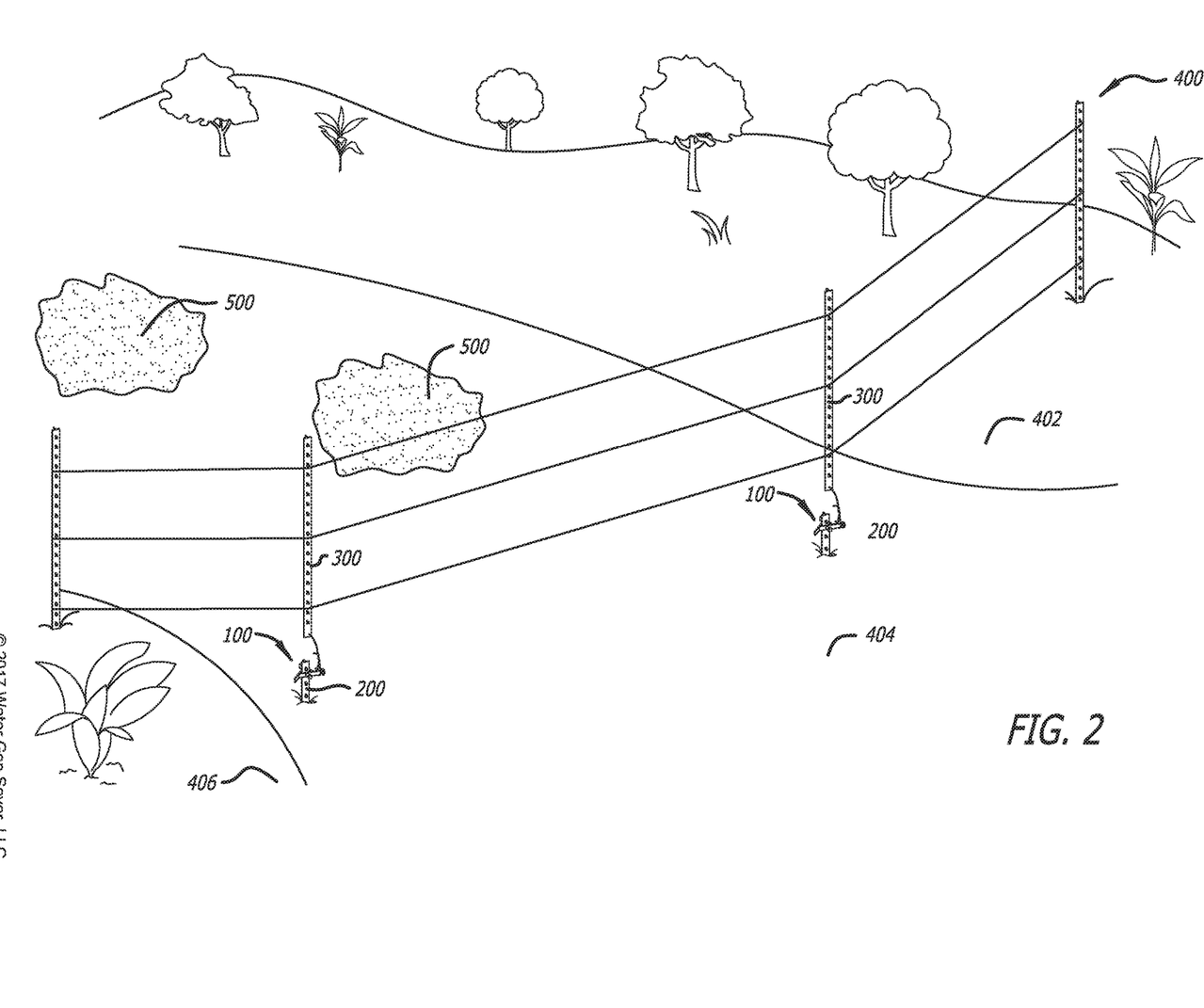
FIG. 2 is a view of a water gap managed breakaway system across a water gap.

FIG. 2 is a view of a water gap managed breakaway system 400 from a far bank 402 across a water gap 404 to a near bank 406. There may be debris 500 sitting in the water gap 404 or moving through the water gap 404. The water gap 404 shown is a small creek. The water gap managed breakaway system 400 as shown includes two t-posts 200, two water gap managed breakaway devices 100 and fencing comprising two floating t-posts 300. Though shown as floating t-posts 300, other types of fencing may be used such as polyvinyl chloride (PVC) fence reinforcers, twist-on reinforcement, wooden posts, or steel posts. PVC reinforcers may be preferable over water gaps in some cases because they are light, relatively sturdy, and do not conduct electricity in cases in which the water gap managed breakaway system is used in conjunction with electric fencing.

Figure 3:
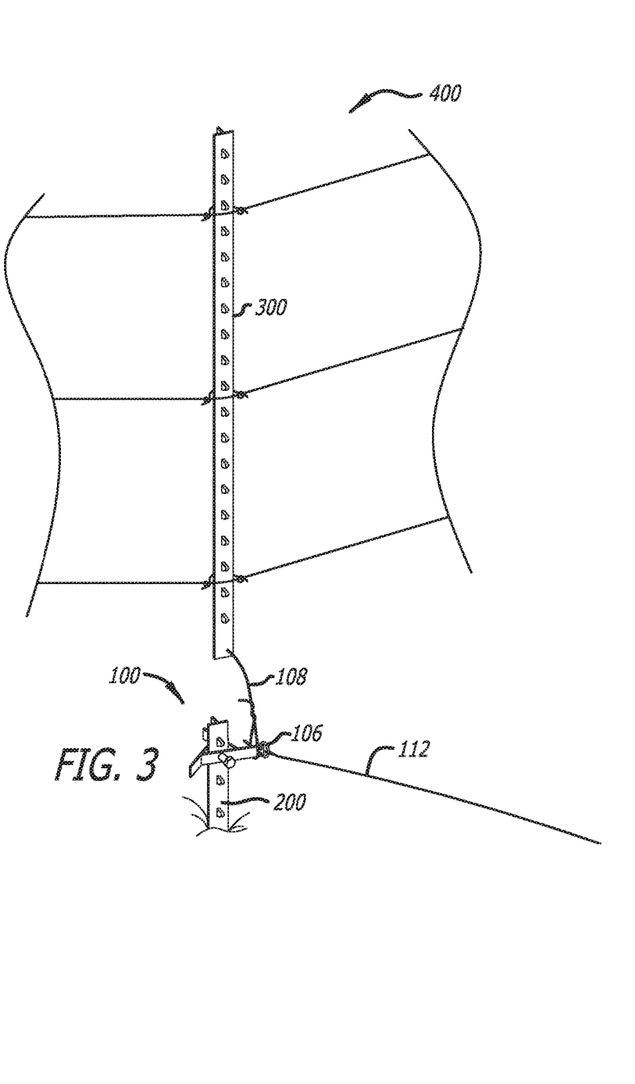
FIG. 3 is a view of a water gap managed breakaway system including a secure pin.

FIG. 3 is a view of a water gap managed breakaway system 400 including a secure pin 106. The secure pin 106 holds the joining member 108 in place on one of the projections 102 (not labeled). The water gap managed breakaway device 100 is fixed to a t-post 200. Each t-post 200 may operate as a "dead men" to maintain a fixed anchor point within the water gap. Although t-post 200 is shown, other dead men may be used as discussed above.

The t-post 200 is, preferably, driven deeply into the water gap ground such that only a small portion of the anchor appears above the ground. For example, one foot or less may be necessary. This anchoring provides a number of benefits. First, by driving the anchor so deeply, it is extremely unlikely to move or become dislodged by water or debris moving through the water gap. Typical tee-posts vary from approximately 8 feet in height down to 3-4 feet in height. With at least 2-3 feet of posting within the ground, anything other than torrential rain and significant debris will have no effect on the location of an anchor driven so deeply into the ground below a water gap. Second, the anchor is unlikely to move, but the fencing, being much more flexible, is able to move and, as discussed below, to break free when water or debris fills the water gap.

The joining member 108 joins the projection 102 to the floating t-post 300 to thereby pull and hold the fencing over the water gap 404 (FIG. 2) downward within and over the water gap 404. If the fencing is not held down sufficiently low over the low-lying area of the water gap 404, then livestock may move freely under the water gap fencing when there is no water moving through the water gap 404.

Or, may put their heads under the fencing and pull it out of the ground or otherwise damage the fencing, which will then require repair.

The joining member 108 may be wire, string, cord, hook, loop, rope, or other attachment mechanism is then looped over one of the three (or more or fewer) projections 102 from the water gap managed breakaway device 100 to hold this additional tension. The upward tension will hold the entire water gap fencing in place above the water gap managed breakaway device 100. As moving water or debris begin to hit or interfere with the water gap managed breakaway device 100 (or more likely, the joining member 108 joining the fencing to the water gap managed breakaway device 100, the wire will work loose and, preferably, come off of the end of one of the projection 102 of the water gap managed breakaway device 100, thereby releasing the tension in the fencing and allowing the overall fence to rise, out of the water gap 404. The water and debris 500 will, then, continue to flow until the water gap fencing is repaired. However, repair will likely be as simple as merely looping the same fencing wire over the same water gap managed breakaway device 100 projection 102 as before, thereby easily repairing the fencing, while ensuring that the fencing does not break during a wet period.

The water gap managed breakaway device 100 may be used in conjunction with electrical fencing. Insulating connectors may be used or electrical fencing may be shielded from direct connection to the water gap managed breakaway device 100 using fiberglass, glass, plastic or other insulators as all or part of the connective portions of the water gap managed breakaway device 100 to the remainder of the electrical fencing. When water gaps 404 fill up with debris and fencing is damaged, the fence may grounds out and an entire fence line may become inoperable. Livestock may damage or escape through the now inoperative fence. Using the water gap managed breakaway device 100, once the fencing is released from the water gap managed breakaway device 100, the electrical fencing is allowed to spring upwards under the tension of the fencing itself, enabling the electrical fencing to remain up and running.

A cord 112 is shown fixed to the secure pin 106 so that the secure pin 106 may be removed by pulling on the cord 112, for example, from the shore without wading into the water gap 404 (FIG. 2) itself. In this way, once water is flowing or shortly before it begins flowing, a user may remove the secure pin 106 so that the joining member 108 may slip off of the projection 102 upon contact with debris and allow the floating t-post 300 to rise to allow debris passing through the water The secure pin 106 engages with a hole 104 drilled through the projection 102 in the water gap managed breakaway device 100 such that the joining member 108 is unable to break away freely. This ensures that nearby cattle, horses or other livestock cannot knock the water gap managed breakaway device 100 fencing loose when no water is present. This is useful, for example, in central California where rain is unlikely to be present for many months at a time. The secure pin 106 gives the user the option to "lock" the water gap managed breakaway device 100 during the off season when no rain or flooding is expected, similar to having an on/off switch.

The cord 112 may alternatively be wire, or tag line. The cord 112 may be attached to the end of the pin 106 with its opposite end accessible on the bank of the water gap 404. If water is expected (or already present), the user can approach the water gap, find the wire or tag line, and pull it to release The water gap managed breakaway device 100 without having to wade out in moving water making it safer for the user if necessary. Although the secure pin 106 is envisioned as a typical pin used in various agricultural applications, other mechanisms may be used such as Velcro®, snaps, braces, clips, wire, buttons, snaps, and various other breakaway attachment mechanisms.

Figure 4:
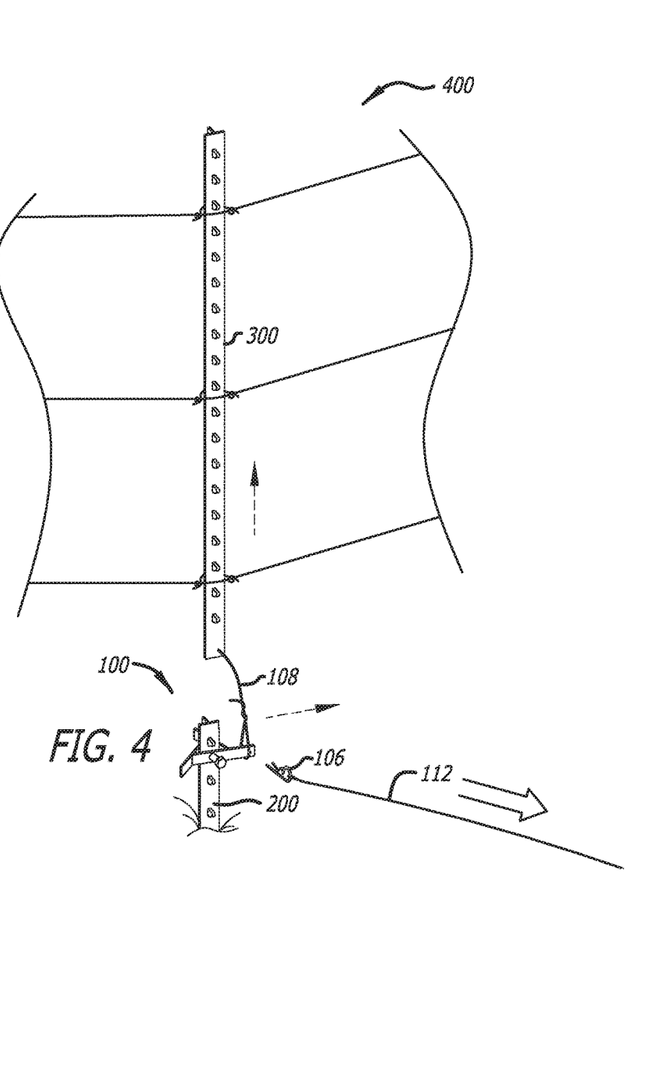
FIG. 4 is a view of a water gap managed breakaway system showing removal of the secure pin.

FIG. 4 is a view of a water gap managed breakaway system 400 showing removal of the secure pin 106. Here, the cord 112 is pulled to remove the secure pen 106 from the projection 102 (not labeled) in the water gap managed breakaway device 100. Once removed, the joining member 108 may slip off of the projection 102 upon contact with debris, as shown. Once the joining member 108 slips off, the water gap managed breakaway device 100 and t-post 200 remain fixed, regardless of the upward movement of the floating t-post 300 and the rest of the joined fencing.

Figure 5:
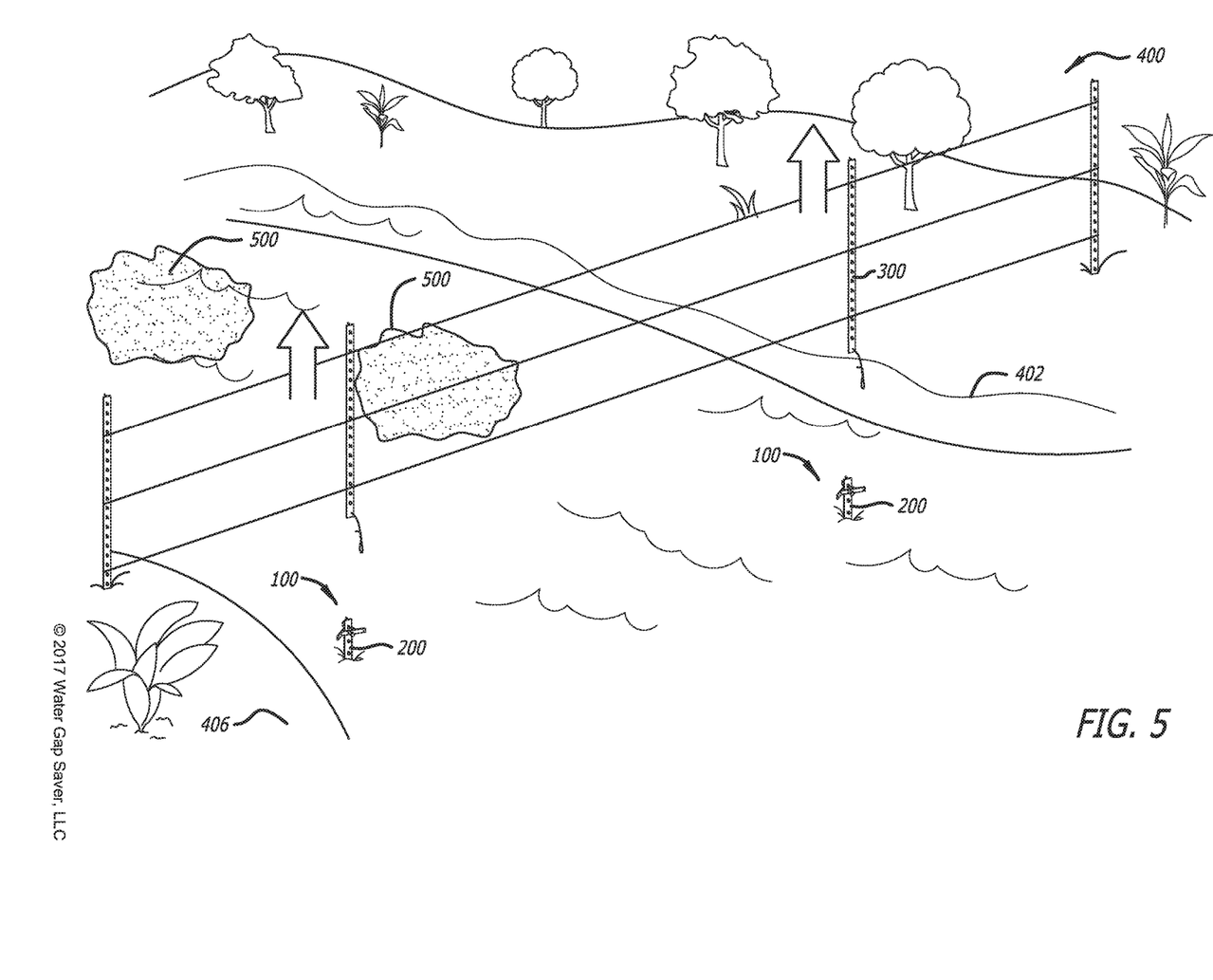
FIG. 5 is a view of a water gap managed breakaway system showing movement of the water gap fencing.

FIG. 5 is a view of a water gap managed breakaway system 400 showing movement of the water gap fencing. As can be seen, the joining member 108 has slipped off of the projection 102 (FIG. 1A) of the water gap managed breakaway device 100 fixed to the t-post 200. As a result, the floating t-posts 300 have moved upwards, in-line with the remainder of the fence line not within the water gap 404. The water in the water gap 404 may have begun to rise and debris may have impacted with the water gap managed breakaway device 100 thereby releasing the tension held by the joining member 108.

Figure 6:
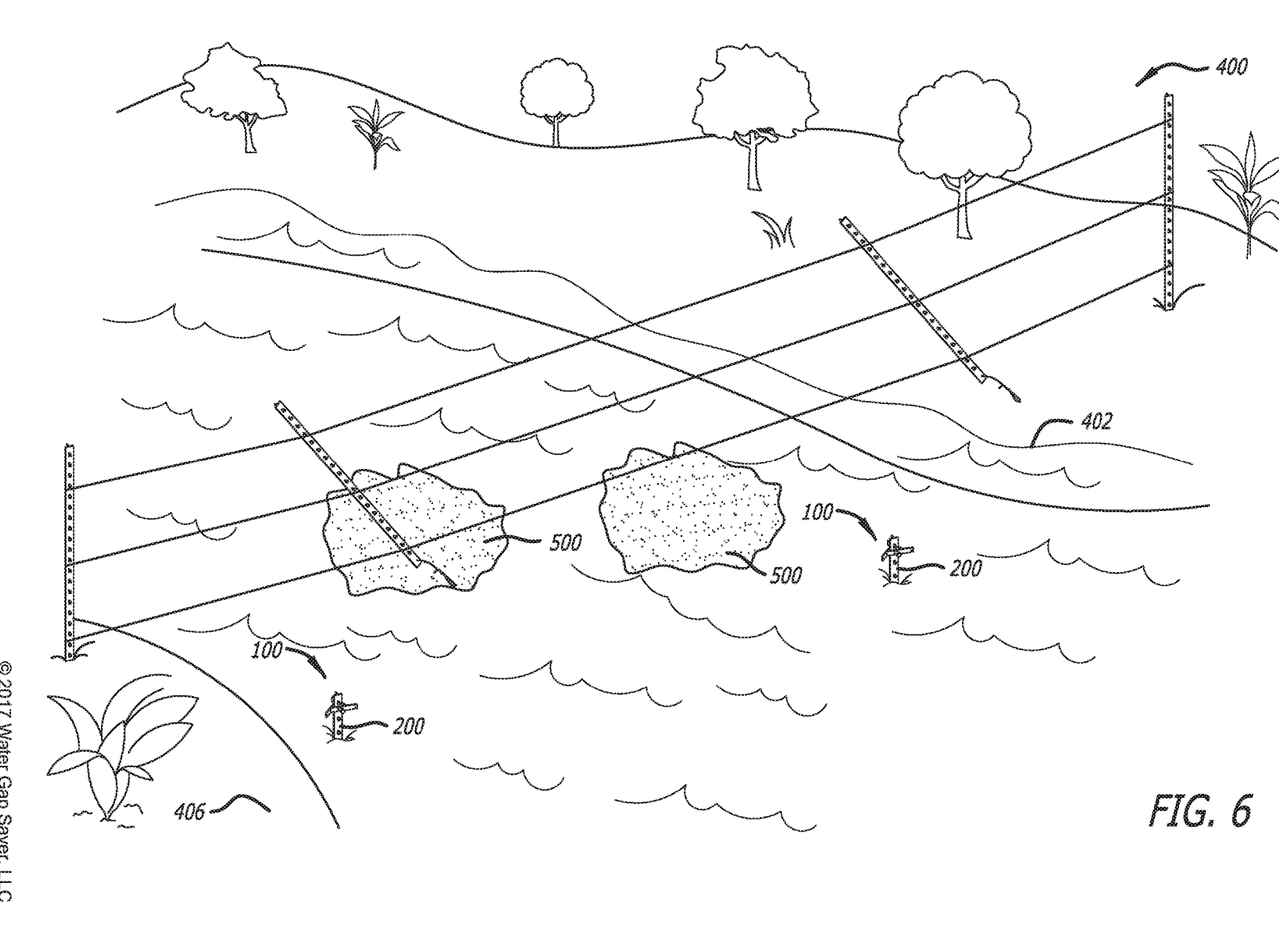
FIG. 6 is a view of a water gap managed breakaway system showing still more movement of the water gap fencing in response to debris moving through the water gap.

FIG. 6 is a view of a water gap managed breakaway system 400 showing still more movement of the water gap fencing in response to debris 500 moving through the water gap 404. In addition to upward movement of the water gap fencing (the floating t-posts 300) in response to release of the joining member 108 from the projection 102 (FIG. 1A).

Once released and after it has moved upward, the fencing may have some slack. As a result, if debris 500 is sufficiently high to come into contact with the fencing over the water gap 404, then the fencing (e.g. the floating t-posts 300) may twist, relative to fixed fence posts on either side of the water gap 404 to enable larger debris 500 or more water to pass through without damaging the fencing and for debris 500 to continue down the water gap 404 without damage to the fencing.

Once the water has subsided, for example, after a period of rain has ended, the fence repairer may return to the water gap, pull down on the joining member 108, hook it over the projection 102 and thereby "repair" the fence over the water gap 404. In this way, damage by debris 500 to the water gap 404 fencing is avoided in most situations and fences over water gaps may quickly be returned to normal operating state following rains or other water gap 404 filling situations.

It is claimed:

1. A water gap managed breakaway device comprising:
 a set of three braces, each comprising an inner end and an outer end, the set formed with joints connecting the inner end of one brace with a point between the inner end and the outer end of another brace such that a triangular opening is formed by the set of three braces with each of the outer ends extending outward from the triangular opening;
 a means for fixing the set of three braces position relative to a length of fence post within a water gap; and
 a joining member configured to join the outer end of at least one of the braces with a fence positioned above the water gap managed breakaway device and configured to maintain a joint between the water gap managed breakaway device and the fence through tension.

2. The water gap managed breakaway device of claim 1 further comprising at least one hole in the outer end of at least one brace of the set of three braces, the at least one hole for receiving a fixing clip to hold the joining member in place.

3. The water gap managed breakaway device of claim 2 further comprising the fixing clip which, when inserted into the at least one hole retains the joining member position on the outer end of one of the set of three braces.

4. The water gap managed breakaway device of claim 1 wherein the joining member is a fixed length of wire, looped over the outer end of the at least one of the set of three braces, to join the outer end of the at least one of the set of three braces with the fence.

5. The water gap managed breakaway device of claim 1 positioned such that the outer end of the at least one of the set of three braces to which the joining member is joined is positioned parallel to a flow of water through a water gap in which the water gap managed breakaway device is placed, such that interaction by debris with the water gap managed breakaway device may interfere with the tension, thereby releasing the joining member and allowing the fence to move free of the water gap managed breakaway device.

6. The water gap managed breakaway device of claim 1 wherein the means for fixing comprises a bolt that as tightened compresses the length of fence post within the triangular opening.

7. A water gap managed breakaway device comprising:
a frame including a triangular internal opening configured to accept a fence post within a water gap and at least one three projections from the frame extending outward from a center of the triangular internal opening substantially parallel to a remainder of the frame; and
a joining member configured to join one of the at least three projections to a fence above the frame by looping over the one of the at least three projections and configured to maintain tension from the fence generated by pulling the fence downward toward the frame before joining when looped over the one of the at least three projections.

8. The water gap managed breakaway device of claim 7 wherein the joining member comprises metal wire joined with the fence.

9. The water gap managed breakaway device of claim 7 with the one of the at least three projections extending in the same direction of water flow such that the joining member breaks free allowing the fence to rise when debris comes into contact with the joining member through release of the tension.

10. The water gap managed breakaway device of claim 7 further comprising:
at least one hole through the one of the at least three projections; and
a retaining clip through the at least one hole for retaining the joining member on the at least one projection until the retaining clip is removed.

11. The water gap managed breakaway device of claim 10 further comprising a cord with a first end fixed to the retaining clip so that the retaining clip may be removed by pulling on the cord from an opposite end of the cord.

12. The water gap managed breakaway device of claim 7 further comprising a fixing member for fixing the frame, relative to the fence post.

13. The water gap managed breakaway device of claim 12 wherein the fixing member comprises a bolt, passing through one portion of the frame that, when tightened, presses against any fence post within the internal opening.

14. The water gap managed breakaway device of claim 13 wherein the bolt holds the frame secure between two studs on the fence post.

15. A water gap managed breakaway system comprising:
a fence span over a water gap, the fence span including at least three fence posts, one on each side of the water gap and a third fence post over the water gap, each fence post connected to another fence post by at least one strand of fence wire;
a frame including an opening configured to fix the frame to an anchor within the water gap, the frame including at least one projection substantially perpendicular to the fence span over the water gap; and
a joining member configured to pull down and to join the at least one projection with the third fence post fence to thereby maintain tension between the fence span and the at least one projection, the joining member configured such that operation of debris on the joining member while the debris passes through the water gap will cause the joining member to cease joining the at least one projection and the third fence post, thereby releasing the tension and allowing the third fence post to rise.

16. The water gap managed breakaway system of claim 15 wherein the at least one projection extends from the frame in the same direction of water flow through the water gap.

17. The water gap managed breakaway system of claim 15 further comprising a bolt, passing through a portion of the frame, configured to fixing the frame relative to the fence post.

18. The water gap managed breakaway system of claim 15 further comprising:
at least one hole through the at least one projection; and
a retaining clip, passing through the at least one hole to thereby retain the joining member in contact with the at least one projection until the retaining clip is removed.

19. The water gap managed breakaway system of claim 18 further comprising a cord with a first end fixed to the retaining clip so that the retaining clip may be removed by pulling on the cord from an opposite end of the cord.

20. The water gap managed breakaway device of claim 19 wherein following removal of the retaining clip, the joining member may break free of the one of the at least three projections upon operation of debris on the joining member.

* * * * *